United States Patent
Kudo et al.

(10) Patent No.: US 9,766,793 B2
(45) Date of Patent: Sep. 19, 2017

(54) INFORMATION PROCESSING DEVICE, INFORMATION PROCESSING METHOD AND PROGRAM

(71) Applicant: SONY CORPORATION, Tokyo (JP)

(72) Inventors: Yusuke Kudo, Kanagawa (JP); Tomoki Uehara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/977,582

(22) Filed: Dec. 21, 2015

(65) Prior Publication Data

US 2016/0110078 A1    Apr. 21, 2016

Related U.S. Application Data

(63) Continuation of application No. 13/487,649, filed on Jun. 4, 2012, now Pat. No. 9,218,113.

(30) Foreign Application Priority Data

Jun. 9, 2011    (JP) ................................. 2011-129014

(51) Int. Cl.
*G06K 9/00* (2006.01)
*G06F 3/0484* (2013.01)
*H04N 13/04* (2006.01)
*G06F 3/0488* (2013.01)

(52) U.S. Cl.
CPC ...... *G06F 3/04845* (2013.01); *G06F 3/04883* (2013.01); *H04N 13/0409* (2013.01); *H04N 13/0422* (2013.01); *H04N 13/0497* (2013.01)

(58) Field of Classification Search
CPC ......... G06T 7/0075; G06T 2207/10012; G06F 3/016; G06F 3/011; G06F 8/34; G06F 8/10
USPC ........................... 382/154; 345/156; 717/105
See application file for complete search history.

(56) References Cited

U.S. PATENT DOCUMENTS

| | | | |
|---|---|---|---|
| 2008/0092110 A1* | 4/2008 | Kawahara | G06F 3/04815 717/105 |
| 2012/0200495 A1* | 8/2012 | Johansson | G06F 3/011 345/156 |
| 2012/0249475 A1* | 10/2012 | Murphy | G06F 1/1694 345/174 |

* cited by examiner

*Primary Examiner* — Ruiping Li
(74) *Attorney, Agent, or Firm* — Chip Law Group

(57) ABSTRACT

An information processing device is provided that includes: an image generation portion that generates a composite image by synthesizing a stereoscopic image with a two-dimensional image that is associated with the stereoscopic image, the stereoscopic image being generated from a right eye image and a left eye image which have parallax therebetween and on which perspective correction is performed; and an identification portion that, when a user operation on the two-dimensional image is detected, identifies the stereoscopic image with which the two-dimensional image is associated, as a selected target.

21 Claims, 17 Drawing Sheets

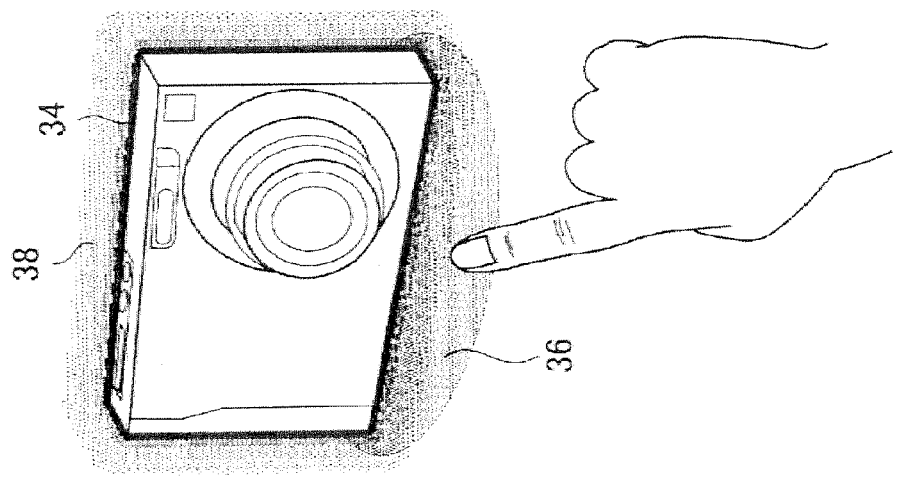
FIG.10
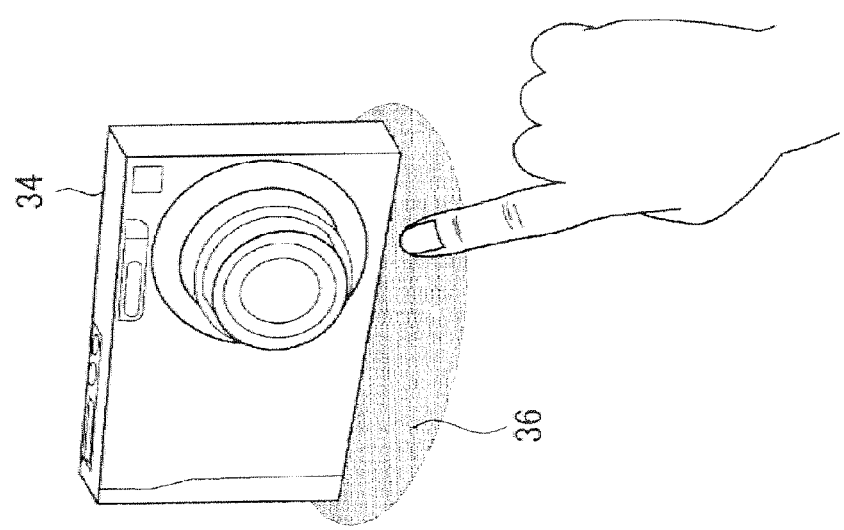

INFORMATION PROCESSING DEVICE, INFORMATION PROCESSING METHOD AND PROGRAM

BACKGROUND

The present disclosure relates to an information processing device, an information processing method and a program.

In recent years, attention is being paid to three-dimensional (3D) stereoscopic images that allow stereoscopic image viewing. As a method for viewing 3D stereoscopic images, a binocular parallax method is being used more and more widely. The binocular parallax method causes a viewer to view a left eye image and a right eye image, between which a parallax is provided, thereby causing the viewer to stereoscopically view an image.

In order to detect an operation that is performed on this type of 3D stereoscopic image, position detection technology that detects an object in a 3D space is disclosed in Japanese Patent Application Publication No. JP-A-2011-13778 and Japanese Patent Application Publication No. JP-A-2010-55508.

SUMMARY

However, with the above-described position detection technology that detects an object in a 3D space, a sensor is required to recognize a position of an operation body in the 3D space. Therefore, in many cases, it is difficult to utilize the technology using a device, such as a mobile device, in which hardware resources are relatively limited.

When it is difficult to utilize the position detection technology that detects an object in a 3D space, it is difficult to achieve an interface, with which a user can directly operate a 3D stereoscopic image. Further, if the user attempts to directly operate the 3D stereoscopic image using a touch sensor, which is normally mounted on a mobile device etc., a displacement occurs between the 3D stereoscopic image that is stereoscopically viewed and a position in which the operation is actually performed. Due to this type of displacement, the user feels a sense of discomfort when operating a 3D image.

To address this, the present disclosure provides an information processing device, an information processing method and a program that are novel and improved and that allow a stereoscopic image to be easily selected without a sense of discomfort.

According to an embodiment of the present disclosure, there is provided an information processing device that includes: an image generation portion that generates a composite image by synthesizing a stereoscopic image with a two-dimensional image that is associated with the stereoscopic image, the stereoscopic image being generated from a right eye image and a left eye image which have parallax therebetween and on which perspective correction is performed; and an identification portion that, when a user operation on the two-dimensional image is detected, identifies the stereoscopic image with which the two-dimensional image is associated, as a selected target.

According to another embodiment of the present disclosure, there is provided an information processing method that includes: generating a composite image by synthesizing a stereoscopic image with a two-dimensional image that is associated with the stereoscopic image, the stereoscopic image being generated from a right eye image and a left eye image which have parallax therebetween and on which perspective correction is performed; and identifying, when a user operation on the two-dimensional image is detected, the stereoscopic image with which the two-dimensional image is associated, as a selected target.

According to another embodiment of the present disclosure, there is provided a program that includes instructions that command a computer to perform: processing that generates a composite image by synthesizing a stereoscopic image with a two-dimensional image that is associated with the stereoscopic image, the stereoscopic image being generated from a right eye image and a left eye image which have parallax therebetween and on which perspective correction is performed; and processing that, when a user operation on the two-dimensional image is detected, identifies the stereoscopic image with which the two-dimensional image is associated, as a selected target.

According to the embodiments of the present disclosure described above, it is possible for a stereoscopic image to be easily selected without a sense of discomfort.

BRIEF DESCRIPTION OF THE DRAWINGS

FIG. 10 is a diagram illustrating a first operation example according to the embodiment of the present disclosure;

DETAILED DESCRIPTION OF THE EMBODIMENT(S)

Figure 1:
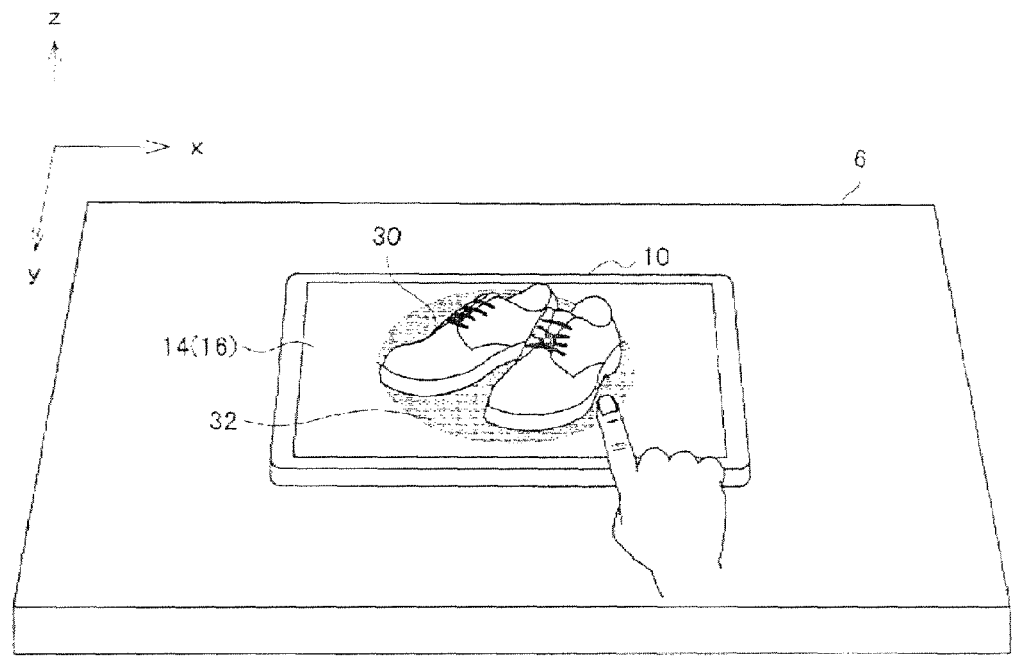
FIG. 1 is a diagram illustrating an overview of an information processing device according to the present disclosure.
Figure 1:
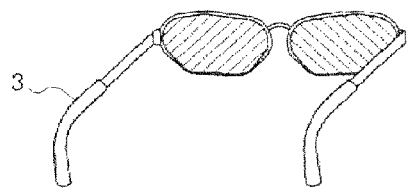

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the explanation will be made in the following order.

1. Overview of information processing device
2. Embodiment of the present disclosure
2-1. Configuration
2-2. Operation processing
2-3. Specific operation examples
3. Conclusion An information processing device (10) according to an embodiment of the present disclosure, will be explained using "2. Embodiment of the present disclosure" as an example. The information processing device (10), includes A: an image generation portion (12) that generates a composite image by synthesizing a stereoscopic image with a two-dimensional image that is associated with the stereoscopic image, the stereoscopic image being generated from a right eye image and a left eye image which have parallax therebetween and on which perspective correction is performed, and B: an identification portion (18) that, when a user operation on the two-dimensional image is detected, identifies the stereoscopic image with which the two-dimensional image is associated, as a selected target.

Next, an overview of the above-described information processing device (10) according to an embodiment of the present disclosure will be explained with reference to FIG. 1.

1. OVERVIEW OF INFORMATION PROCESSING DEVICE

FIG. 1 is a diagram illustrating the overview of the information processing device according to an embodiment of the present disclosure. As shown in FIG. 1, the information processing device 10 includes a display portion 14. A tablet computer is an example of the information processing device 10. The display portion 14 displays an image for both eyes having parallax in a phantogram format (which will be described later). Therefore, when a user observes the information processing device 10 placed on a horizontal plane, such as a desk 6, through glasses 3 from diagonally above, the user can see a stereoscopic image 30 as if it really exists, as shown in FIG. 1.

Further, the display portion 14 displays a two-dimensional image 32 as a deformed shadow of the stereoscopic image 30. As described above, the stereoscopic image 30 looks as if it really exists on the information processing device 10 placed on the desk or the like. Therefore, the two-dimensional image 32 displayed on the display portion 14 looks like a shadow of the stereoscopic image 30 that falls on the plane. If the user performs a touch operation on the two-dimensional image 32, which is displayed as the shadow in this manner, the user can indirectly operate the stereoscopic image 30 without a sense of discomfort. For example, when the display portion 14 is a touch panel display that is integrated with an operation input portion 16, the user can perform a touch operation on the two-dimensional image 32 displayed on the touch panel display.

Generally, when the user directly operates a stereoscopic image, it is necessary to detect a spatial position of the user operation, in x, y and z directions. Therefore, in many cases, it is difficult to achieve the detection using a device, such as a mobile device, in which hardware resources are relatively limited. Further, when the user directly operates the stereoscopic image, it is also necessary to detect a position of the stereoscopic image perceived by the user, in the x, y and z directions. Therefore, for example, when the stereoscopic image has a complex pop-up shape, it is difficult to accurately recognize the perceived position.

To address this, according to the information processing device 10 of an embodiment of the present disclosure, display control of the stereoscopic image 30 is performed in accordance with an operation on the two-dimensional image 32, without detecting the shape of the stereoscopic image 30 and the position of the user operation in the x, y and z directions of the three-dimensional space. In other words, if the information processing device 10 can detect only an operation position of the two-dimensional image 32 in the x and y directions, it is possible to achieve a stereoscopic image operation that is performed in accordance with a user operation.

Further, according to the information processing device 10, it is possible to provide a uniform operation interface by expressing an operation handle of the stereoscopic image 30 as a shadow of the stereoscopic image 30 that falls on the plane of the display portion 14.

In this way, the user indirectly operates the stereoscopic image 30 by directly operating the two-dimensional image 32 that is displayed as the shadow of the stereoscopic image 30. As a result, the user can perform the operation of the stereoscopic image 30 without a sense of discomfort.

Phantogram

As described above, the information processing device of an embodiment of the present disclosure expresses the shadow, which is the operation handle of the stereoscopic image 30, as the shadow of the stereoscopic image 30 that falls on the plane of the display portion 14. Therefore, when the display portion 14 is horizontally placed, the information processing device of an embodiment of the present disclosure generates the stereoscopic image 30 that looks as if it pops up from the display portion 14. Technology known as a "phantogram" is an example of a method for achieving this type of stereoscopic image. Hereinafter, the phantogram will be explained with reference to FIG. 2.

Figure 2:
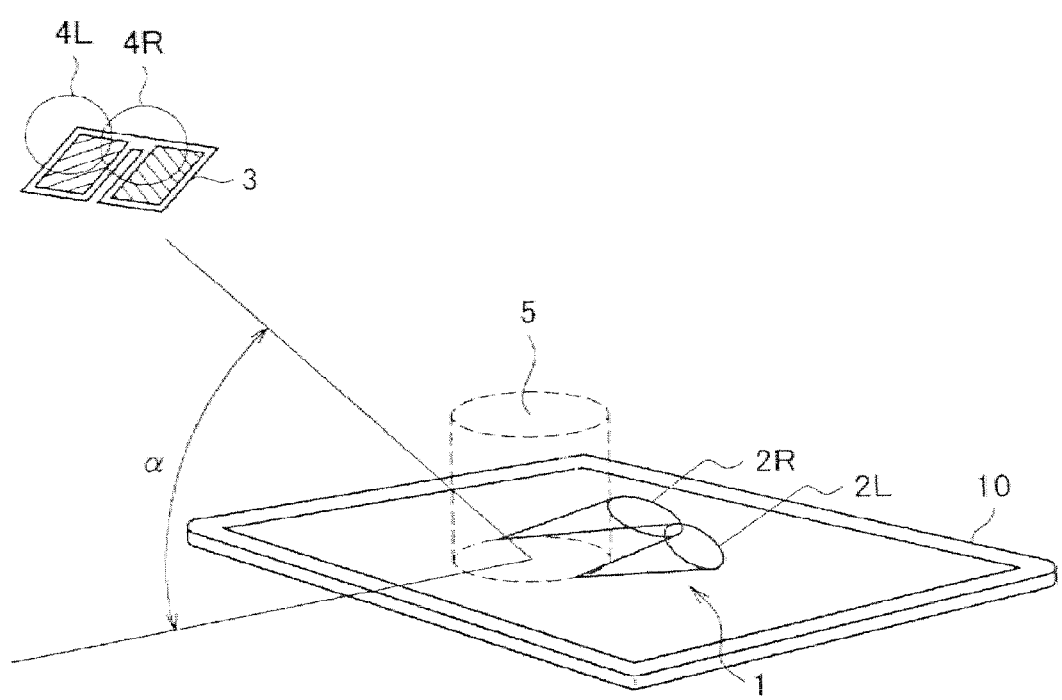
FIG. 2 is a diagram illustrating an overview of a phantogram.

FIG. 2 is a diagram illustrating an overview of the phantogram. As shown in FIG. 2, an anaglyph 1 that is generated by the phantogram format includes a left eye image 2L and a right eye image 2R, which are drawn using two different individual colors, such as red and cyan. The left eye image 2L and the right eye image 2R are images obtained by performing perspective correction on each of the left eye image and the right eye image that have parallax therebetween when viewed from diagonally above.

When a display device is placed such that the anaglyph 1 is horizontal and the display device is observed from diagonally above through the glasses 3 that use, as a lens, color filters respectively corresponding to the colors of the left eye image 21, and the right eye image 2R, it looks as if a stereoscopic image 5 actually exists there. An angle α when viewed from diagonally above is a predetermined angle that is equal to or less than 180 degrees, such as 45 degrees, for example.

When the display device that is placed horizontally is observed from diagonally above, the user perceives the display screen of the display device as if it is an extension of a reference surface, such as a desk, a floor or the like. Further, since the perspective of the stereoscopic image 5 is emphasized by the phantogram, to the stereoscopic image 5 is viewed by the user as if it has popped up from the reference surface. As a result, the stereoscopic image 5 looks as if it actually exists there in a more realistic manner.

In this way, when the display screen that is placed horizontally is taken as the reference surface, the stereoscopic image generated by the phantogram format looks as if an object is placed on the reference surface. Therefore, the user can perceive the stereoscopic image with a greater sense of reality. In an information processing device according to an embodiment of the present disclosure that will be explained below, a stereoscopic image is generated by this type of phantogram format.

2. EMBODIMENT OF THE PRESENT DISCLOSURE

2-1. Configuration

A configuration of the information processing device 10 according to the embodiment of the present disclosure will be explained with reference to FIG. 3 to FIG. 7.

Figure 3:
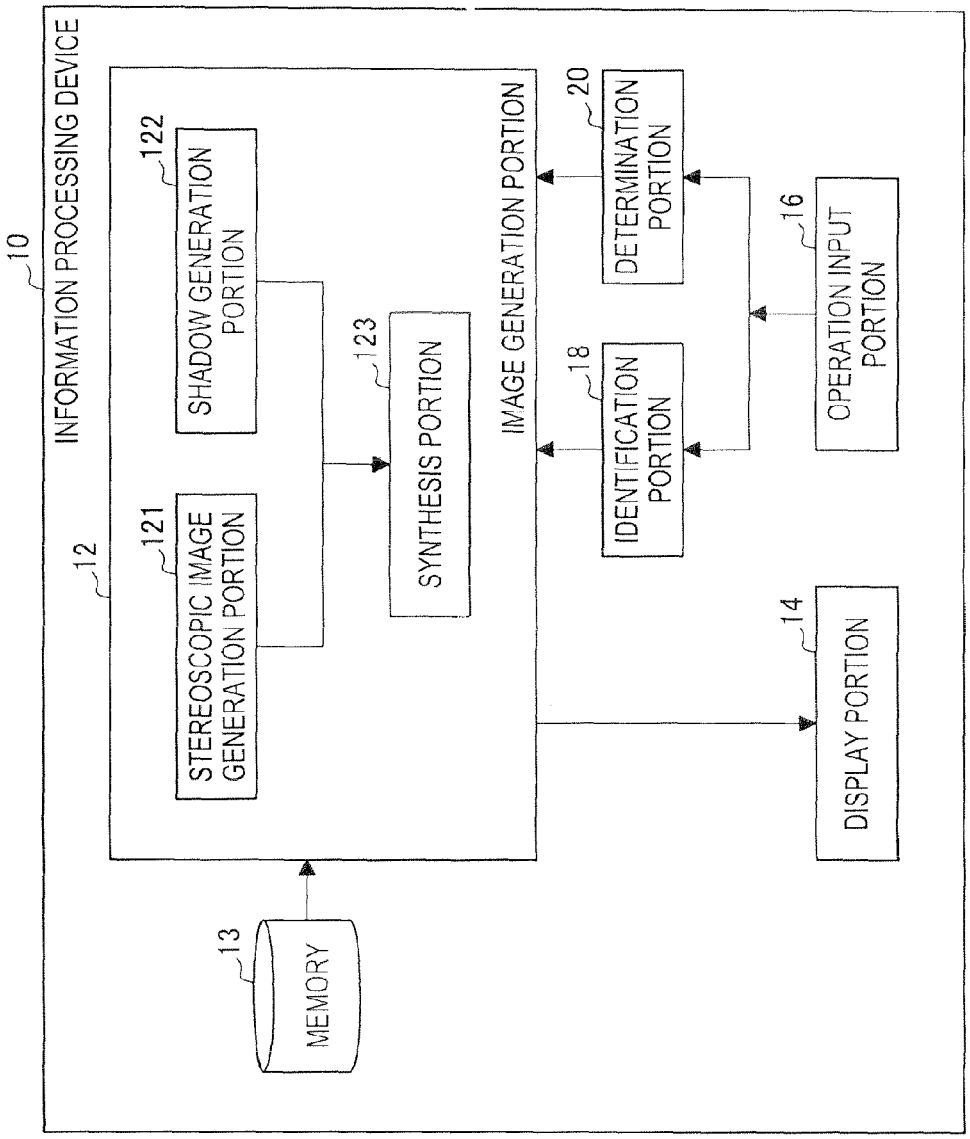
FIG. 3 is a block configuration diagram of an information processing device according to an embodiment of the present disclosure.

FIG. 3 is a block configuration diagram of the information processing device 10 according to the present embodiment. As shown in FIG. 3, the information processing device 10 is provided with the image generation portion 12, a memory 13, the display portion 14, the operation input portion 16, the identification portion 18 and a determination portion 20.

The image generation portion 12 has ε function of generating an image that is displayed on the display portion 14. Further, the image generation portion 12 according to the present embodiment performs control that changes display of at least one of a stereoscopic image identified as a selected target and a two-dimensional image on which a touch operation has been performed. Specifically, the image generation portion 12 is provided with a stereoscopic image generation portion 121, a shadow generation portion 122 and a synthesis portion 123. The stereoscopic image generation portion 121 acquires model data from the memory 13 and, based on the model data, generates an image for both eyes having parallax.

Note that the stereoscopic image generation portion 121 according to the present embodiment generates a stereoscopic image using the phantogram format. Here, stereoscopic image generation using the phantogram format will be explained with reference to FIG. 4.

Figure 4:
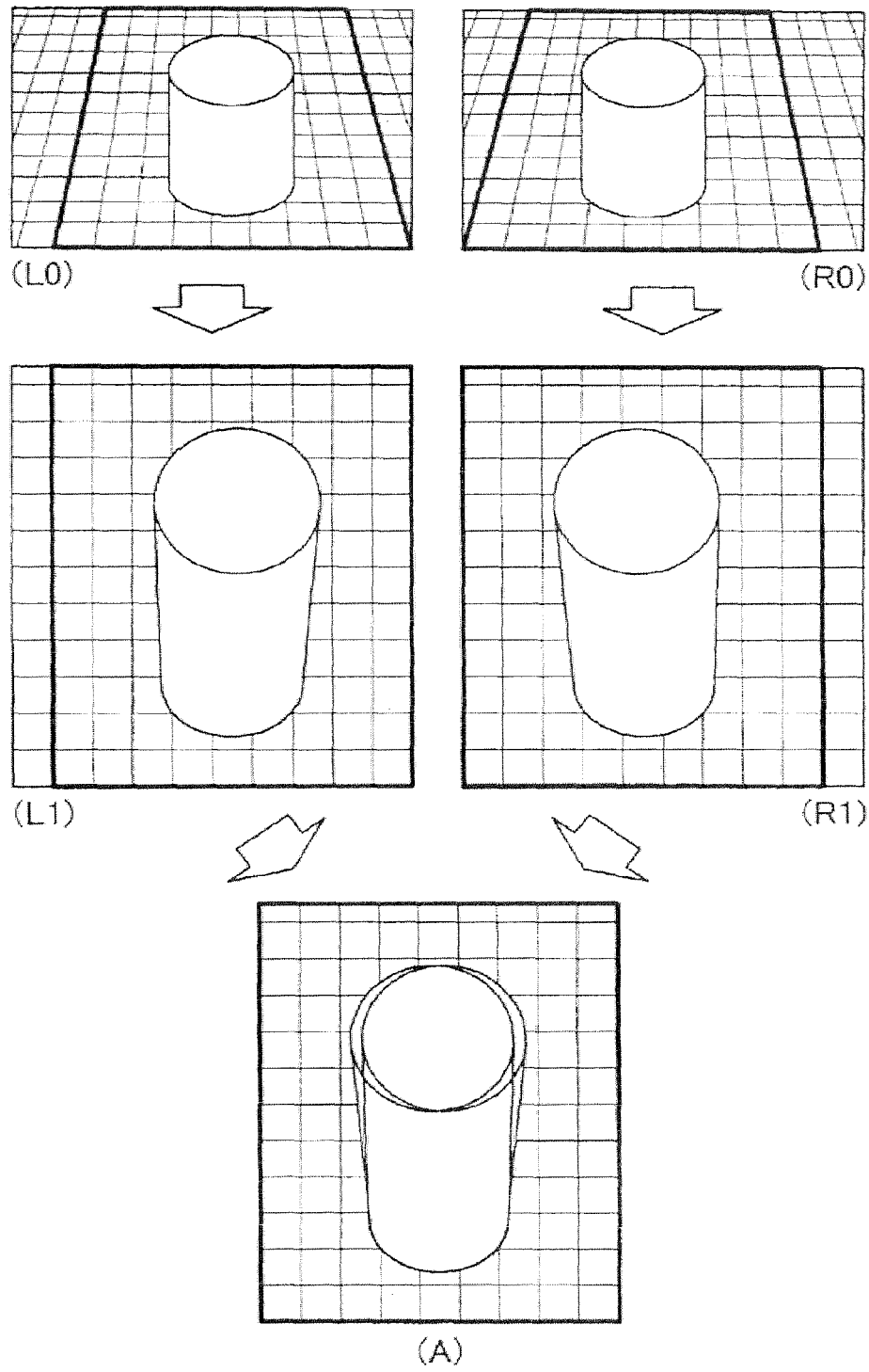
FIG. 4 is a diagram illustrating a procedure to create a phantogram based on model data.

FIG. 4 is a diagram illustrating a procedure to create a phantogram based on the model data. As shown in FIG. 4, the model data indicated by a left eye image L0 and a right eye image R0 having parallax therebetween that is included in the model data includes data corresponding to all variations (for the front side, for rotation, for zoom in and zoom out). However, here, the phantogram is created based on the model data for the front side.

To make the explanation easier to understand, the left eye image L0 and the right eye image R0 shown in FIG. 4 are expressed as images in which a lattice pattern is drawn on the reference surface on which a subject is placed. Further, the left eye image L0, and the right eye image R0 are images when viewed from diagonally above. The angle when viewed from diagonally above is a predetermined angle that is equal to or less than 180 degrees, such as 45 degrees, for example.

Images L1 and R1 are obtained by performing perspective correction on the model data indicated by the left eye image L0 and the right eye image R0. The perspective correction is coordinate conversion by perspective transformation, and it is also referred to as perspective conversion. In the images L1 and R1, graphics on a surface that is parallel to the reference plane are displayed without distortion. Therefore, the lattice pattern is a square lattice pattern in which lattices intersect at a right angle.

Then, the images L1 and R1 are overlaid as different color images and an anaglyph A is created, which is used as the phantogram.

The stereoscopic image generation portion 121 inputs the stereoscopic image (phantogram) generated in this manner to the synthesis portion 123.

Figure 5:
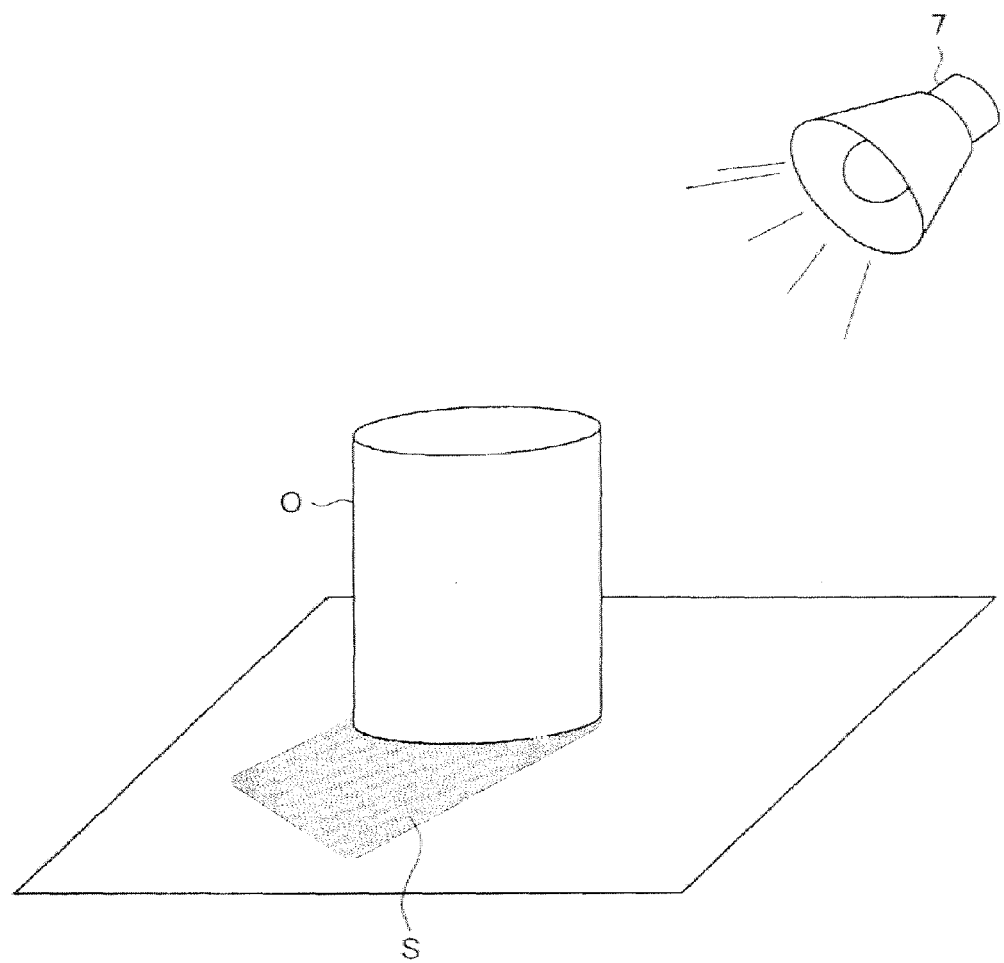
FIG. 5 is a diagram illustrating, a shadow that occurs when light from a virtual light source hits an object.

The shadow generation portion 122 generates a shadow corresponding to the model using a two-dimensional image. As shown in FIG. 5, the shadow generated by the shadow generation portion 122 may be a shadow S that is generated corresponding to the shape of an object O when light from a virtual light source 7 hits the object O. Further, the shadow generated by the shadow generation portion 122 may be a shadow whose shape is simplified by deformation. Further, the shadow generation portion 122 inputs the generated two-dimensional image to the synthesis portion 123.

The synthesis portion 123 generates a composite image by synthesizing the stereoscopic image generated by the stereoscopic image generation portion 121 with the two-dimensional image generated as the shadow of the stereoscopic image by the shadow generation portion 122. The synthesis portion 123 inputs the generated composite image to the display portion 14.

The memory 13 is a data storage device and is an example of a storage portion of the information processing device 10. The memory 13 may include a storage medium, a recording device that records data onto the storage medium, a reading device that reads out data from the storage medium, a deletion device that deletes the data recorded on the storage medium, and the like. The memory 13 is formed by a hard disk drive (HDD), for example. The memory 13 drives a hard disk and stores programs executed by the information processing device 10 and various types of data. Further, the memory 13 according to the present embodiment stores the model data including various types of variations for stereoscopic image generation.

The display portion 14 has a function of displaying an image on the display screen. Further, the function of the display portion 14 is achieved by, for example, a cathode ray tube (CRT) display device, a liquid crystal display (LCD) device or an organic light emitting diode (OLED) device. The display portion 14 according to the present embodiment displays the composite image input from the image generation portion 12.

The operation input portion 16 has a function of detecting an operation performed by the user. The function of the operation input portion 16 is achieved by a touch sensor, a proximity sensor, an operation button or the like. In this specification, a touch panel display, in which the display portion 14 and the operation input portion 16 are integrally formed, is used as an example. The operation input portion 16 according to the present embodiment detects a user operation, such as a touch operation, a drag operation or the like, performed on the displayed two-dimensional image, and inputs the detection result to the identification portion 18 and the determination portion 20. Note that, in this specification, a case in which the operation input portion 16 is a touch sensor is explained as an example. However, the present disclosure is not limited to this example, and a proximity sensor may be used to detect a user operation, such as a touch operation, a drag operation or the like.

Based on the detection result input from the operation input portion 16, the identification portion 18 identifies, as a selected target, the stereoscopic image associated with the two-dimensional image on which the touch operation (including a tap or click operation) has been performed. For example, when the two-dimensional image is displayed in an associated manner as a shadow that overlaps with the stereoscopic image, the identification portion 18 identifies, as a selected target, the stereoscopic image that is displayed overlapping with the two-dimensional image on which the touch operation has been performed.

Note that, when the two-dimensional image is a shadow of a floating stereoscopic image, there is a case in which the shadow does not overlap with the stereoscopic image and it is displayed separately from the stereoscopic image. In this case, in order to indicate an associated relationship between the stereoscopic image and the two-dimensional image that is the shadow of the stereoscopic image, the two-dimensional image may include display indicating the stereoscopic image. Specific examples of the two-dimensional image that includes the display indicating the stereoscopic image will be explained with reference to FIG. 6 and FIG. 7.

Figure 6:
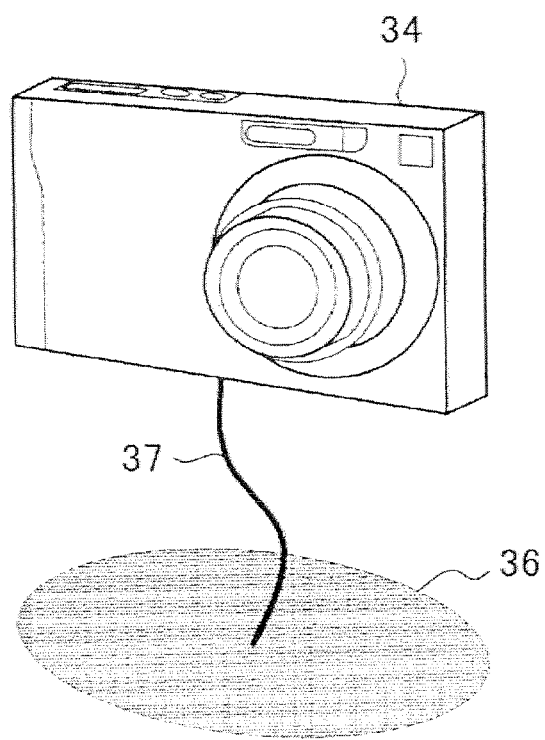
FIG. 6 is a diagram showing a display example that clearly indicates an associated relationship between a floating stereoscopic image and a two-dimensional image that is a shadow of the floating stereoscopic image.

FIG. 6 is a diagram showing a display example that clearly indicates an associated relationship between a floating stereoscopic image 34 and a two-dimensional image 36 that is a shadow of the floating stereoscopic image 34. As shown in FIG. 6, the associated relationship may be indicated by performing display that connects the stereoscopic image 34 and the two-dimensional image 36 that is the shadow of the stereoscopic image 34 using a code 37 that is a stereoscopic image.

Figure 7:
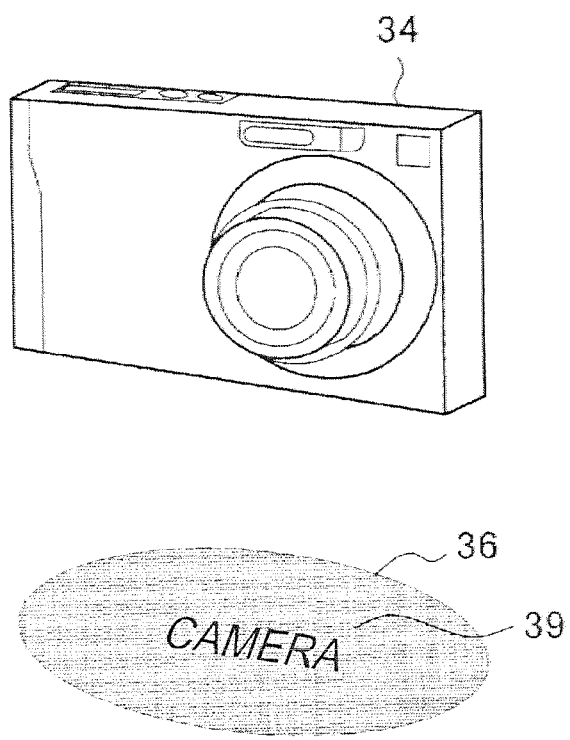
FIG. 7 is a diagram showing another display example that clearly indicates the associated relationship between the floating stereoscopic image and the two-dimensional image that is the shadow of the floating stereoscopic image.

FIG. 7 is a diagram showing another display example that clearly indicates the associated relationship between the floating stereoscopic image 34 and the two-dimensional image 36 that is the shadow of the floating stereoscopic image 34. As shown in FIG. 7, the associated relationship may be indicated by displaying, on the two-dimensional image 36, character information 39 that indicates of which stereoscopic image the two-dimensional image 36 is a shadow. Hereinabove, the processing performed by the identification portion 18 is explained. Next, returning to FIG. 3, the explanation about the configuration of the information processing device 10 will be continued.

The determination portion 20 determines a predetermined user operation on the two-dimensional image displayed on the display portion 14, based on the detection result input from the operation input portion 16. The detection result is indicated by two-dimensional coordinates of a position which the user touches or comes very close to touching, for example. The determination portion 20 determines whether or not the predetermined user operation has been performed on the two-dimensional image.

Examples of the predetermined user operation include a drag operation, a pinch-out operation, a pinch-in operation, a rotation operation and the like. The determination portion 20 inputs, to the image generation portion 12, what type of user operation is performed and an operation amount such as a drag distance, as the determination result.

Hereinabove, the configuration of the information processing device 10 according to the present embodiment is explained in detail. Next, operation processing that is performed in the information processing device 10 according to the present embodiment will be explained with reference to FIG. 8 and FIG. 9.

2-2. Operation Processing

Figure 8:
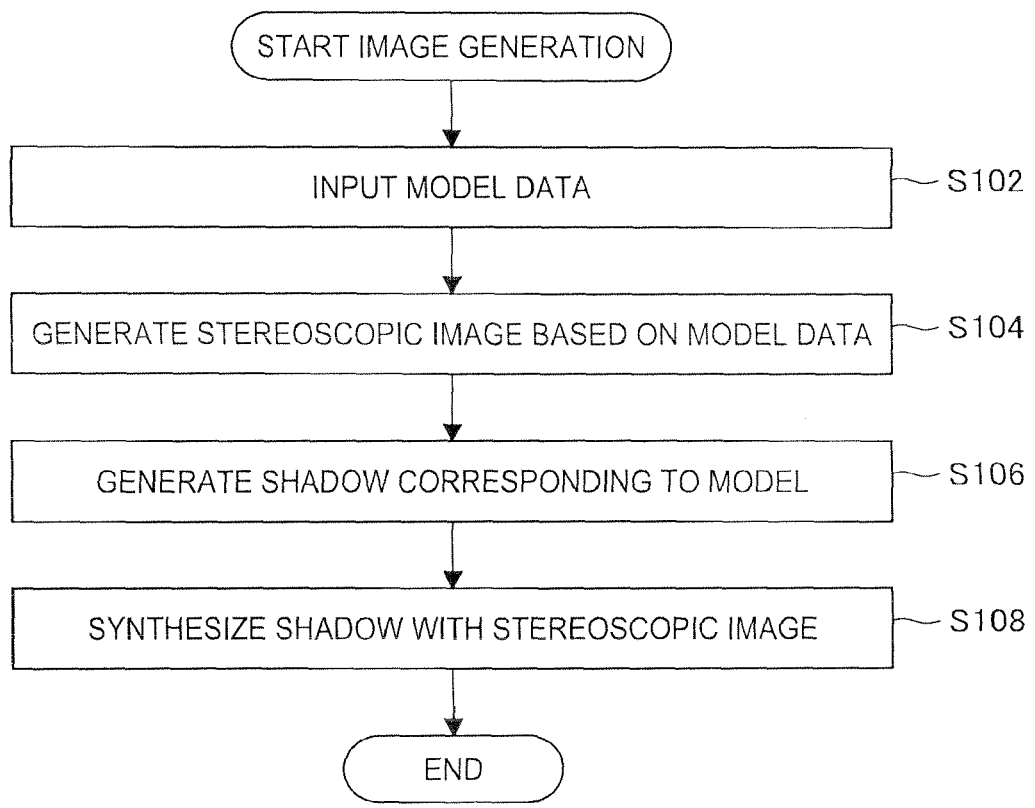
FIG. 8 is a flowchart showing operation processing that is performed when the information processing device according to the embodiment of the present disclosure performs image generation.

FIG. 8 is a flowchart showing operation processing that is performed when the information processing device 10 according to the present embodiment performs image generation. As shown in FIG. 8, first, at step S102, the model data is input to the image generation portion 12. Next, at step S104, the stereoscopic image generation portion 121 generates a stereoscopic image based on the model data.

Next, at step S106, the shadow generation portion 122 generates a shadow corresponding to a model, using a two-dimensional image.

Then, at step S108, the synthesis portion 123 synthesizes the stereoscopic image generated by the stereoscopic image generation portion 121 and the two-dimensional image generated by the shadow generation portion 122, thereby generating a composite image. Note that the synthesis portion 123 inputs the generated composite image to the display portion 14.

In this way, the image generation portion 12 generates the composite image to be displayed on the display portion 14. Next, operation processing that is performed when the composite image is changed in accordance with a user operation on the composite image displayed on the display portion 14 will be explained with reference to FIG. 9.

Figure 9:
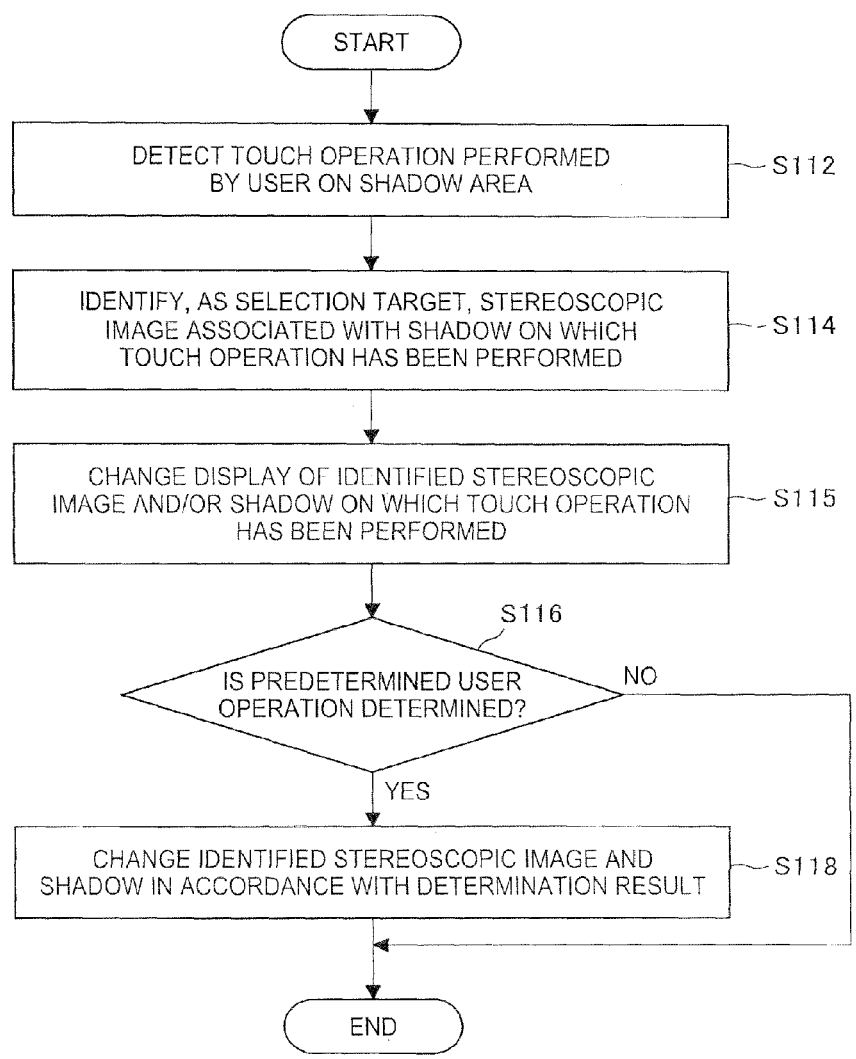
FIG. 9 is a flowchart showing operation processing that is performed when the information processing device according to the embodiment of the present disclosure changes a composite image in accordance with a user operation.

FIG. 9 is a flowchart showing the operation processing that is performed when the information processing device 10 according to the present embodiment changes the composite image in accordance with a user operation. As shown in FIG. 9, first, at step S12, the operation input portion 16 detects a touch operation performed by the user on the two-dimensional image, which is a shadow area, and inputs the detection result to the identification portion 18 and to the determination portion 20.

Next, at step S114, based on the detection result, the identification portion 18 identifies, as a selected target, the stereoscopic image associated with the two-dimensional image on which the touch operation has been performed. Further, the identification portion 18 inputs the identification result to the image generation portion 12.

Next, at step S115, the image generation portion 12 performs control that changes display of at least one of the stereoscopic image identified as the selected target and the two-dimensional image on which the touch operation has been performed. As a result, feedback of the touch operation is performed by the display portion 14 and the user can recognize that the selection is completed successfully. The display change in accordance with the touch operation (including a tap or click operation) will be explained in the next section "2-3. Specific operation examples".

Next, at step S116, the determination portion 20 determines whether or not the user operation detected by the operation input portion 16 is the predetermined user operation. When the detected user operation is the predetermined user operation, the processing proceeds to step S118. On the other hand, when the detected user operation is not the predetermined user operation, the processing ends.

Then, at step S118, in accordance with the predetermined user operation determined by the determination portion 20, the image generation portion 12 changes the display of at least one of the stereoscopic image identified by the identification portion 18 and the two-dimensional image on which the touch operation has been performed. As a result, feedback of the predetermined user operation is performed by the display portion 14. Here, examples of the predetermined user operation include a drag operation, a pinch-out operation, a pinch-in operation, a rotation operation and the like. The display change in accordance with each predetermined operation will be explained in the next section "2-3. Specific operation examples".

The operation processing of the information processing device 10 according to the present embodiment is explained above. Next, how the composite image changes in accordance with the determination result by the determination portion 20 will be specifically explained using a first operation example to a sixth operation example.

2-3. Specific Operation Examples

First Operation Example

The first operation example is an example when the user performs a touch operation (including a tap or click operation) on a two-dimensional image. When a tap operation is determined as a user operation by the determination portion 20, the image generation portion 12 causes at least one of the two-dimensional image on which the tap operation has been performed and the stereoscopic image associated with the two-dimensional image to change, and thereby indicates that they are in a selected state. Hereinafter, the change in the composite image according to the first operation example will be explained with reference to FIG. 10 and FIG. 11.

FIG. 10 is a diagram illustrating the first operation example according to the present embodiment. As shown in FIG. 10, when the stereoscopic image 34 and the shadow 36, which is a two-dimensional image overlapped with the stereoscopic image 34, are displayed, if the user performs a tap operation on the shadow 36, a light-emitting image 38 is stereoscopically displayed around the stereoscopic image 34. As alternatives, the image generation portion 12 may cause the color of the stereoscopic image 34 to change, may perform a motion change, such as rotating the stereoscopic image 34, or may cause the stereoscopic image 34 to flash on and off.

Figure 11:
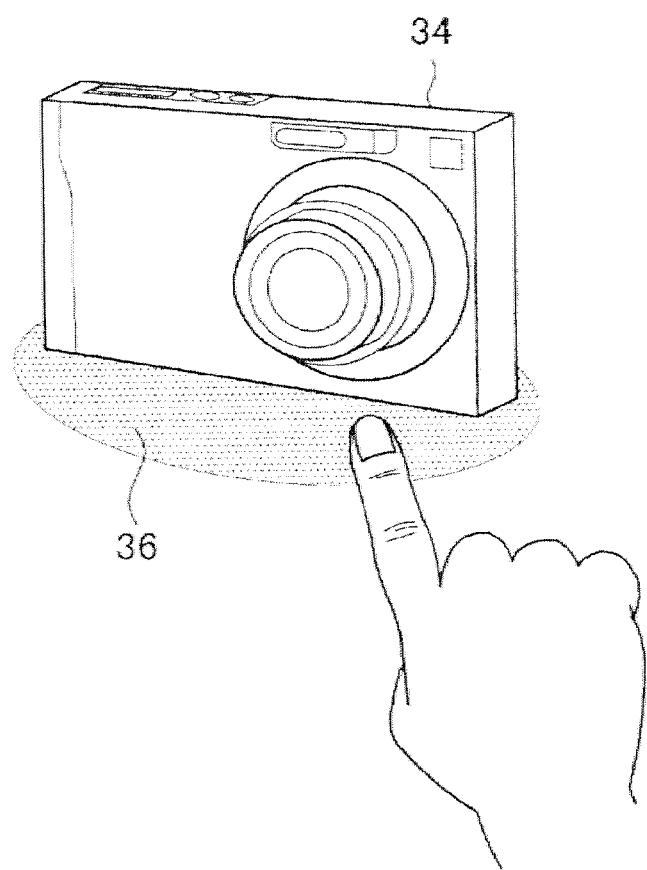
FIG. 11 is a diagram illustrating a modified example of the first operation example according to the embodiment of the present disclosure.

FIG. 11 is a diagram illustrating a modified example of the first operation example according to the present embodiment. As shown in FIG. 11, when the stereoscopic image 34 and the shadow 36, which is the two-dimensional image overlapped with the stereoscopic image 34, are displayed, if the user performs a tap operation on the shadow 36, the color of the shadow 36 changes. As alternatives, the image generation portion 12 may lighten or deepen the shadow 36, may perform a motion change, such as a momentary change of the shape of the shadow 36, or may cause the shadow 36 to flash on and off, in response to the tap operation by the user.

Second Operation Example

The second operation example is an example when the user performs a drag operation on a two-dimensional image. When the drag operation is determined as a user operation by the determination portion 20, the image generation portion 12 causes the stereoscopic image and the two-dimensional image to move in a direction of the drag operation. Hereinafter, a change in a composite image according to the second operation example will be explained with reference to FIG. 12.

Figure 12:
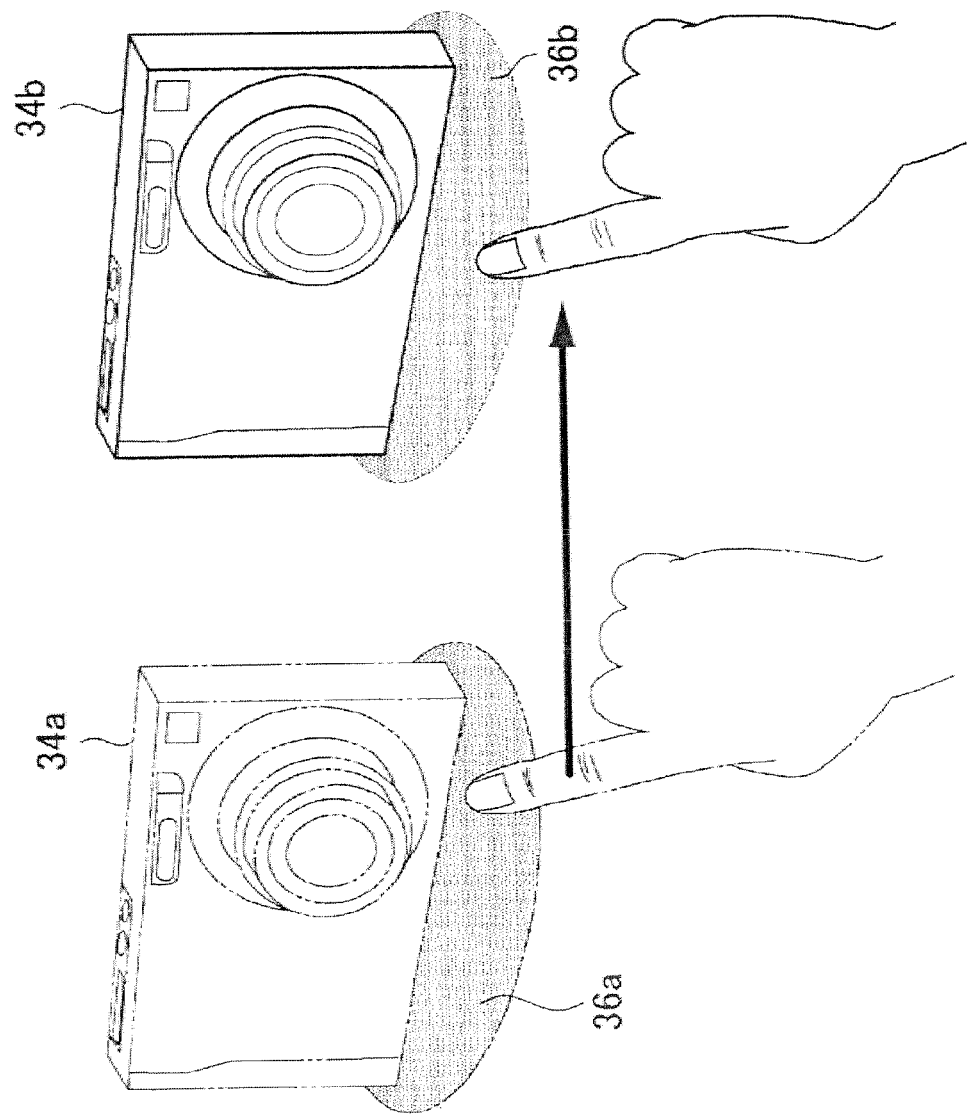
FIG. 12 is a diagram illustrating a second operation example according to the embodiment of the present disclosure.

FIG. 12 is a diagram illustrating the second operation example according to the present embodiment. As shown in FIG. 12, when a shadow 36*a* of a stereoscopic image 34*a* is dragged in the right direction, a display position moves in the right direction as shown by a stereoscopic image 34*b* and a shadow 36*b*.

Third Operation Example

The third operation example is an example when the user performs a pinch-out operation or a pinch-in operation on a two-dimensional image. When the pinch-out operation or the pinch-in operation is determined as a user operation by the determination portion 20, the image generation portion 12 causes the size of the two-dimensional image on which the operation has been performed and the size of the stereoscopic image associated with the two-dimensional image to change. Hereinafter, a change in the composite image according to the third operation example will be explained with reference to FIG. 13 and FIG. 14.

Figure 13:
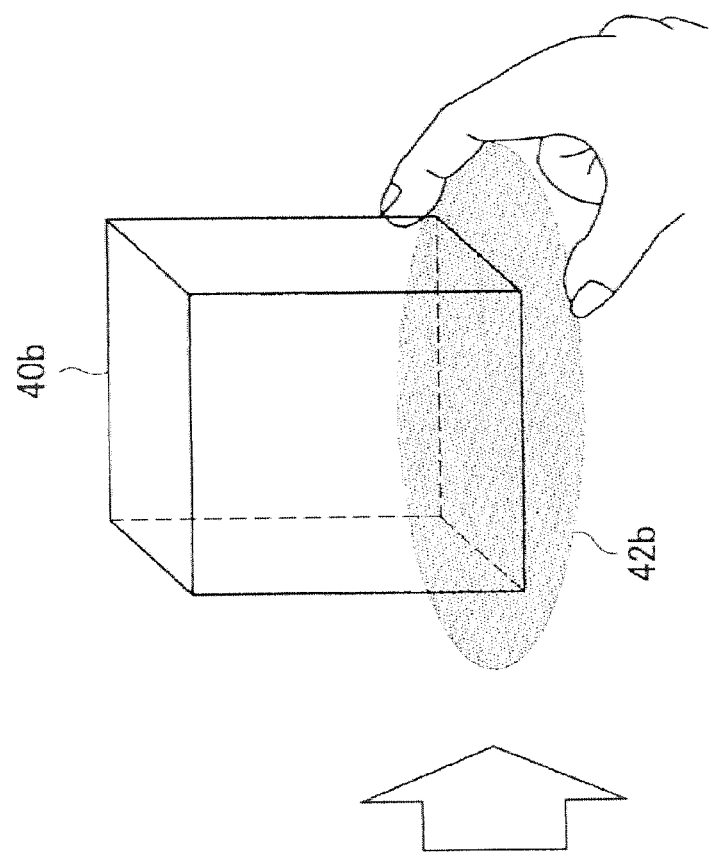
FIG. 13 is a diagram illustrating a pinch-out operation in a third operation example according to the embodiment of the present disclosure.
Figure 13:
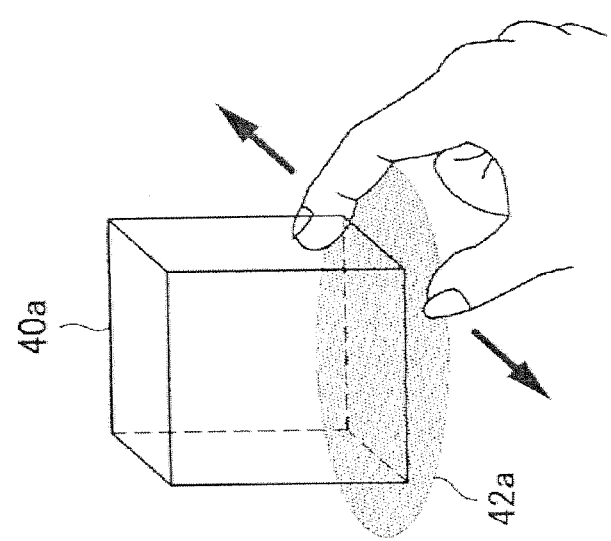

FIG. 13 is a diagram illustrating a pinch-out operation in the third operation example according to the present embodiment. As shown in FIG. 13, when a pinch-out operation is performed on a shadow 42*a* of a stereoscopic image 40*a*, the shadow is displayed to be larger in accordance with a distance between the fingers of the user, as shown by a shadow 42*b*. Further, as the shadow is displayed to be larger, the stereoscopic image is also displayed to be larger in an isotropic manner, as shown by a stereoscopic image 40*b*.

Figure 14:
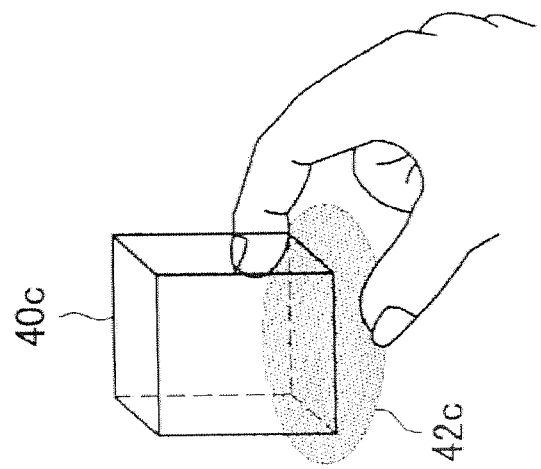
FIG. 14 is a diagram illustrating a pinch-in operation in the third operation example according to the embodiment of the present disclosure.
Figure 14:
Figure 14:
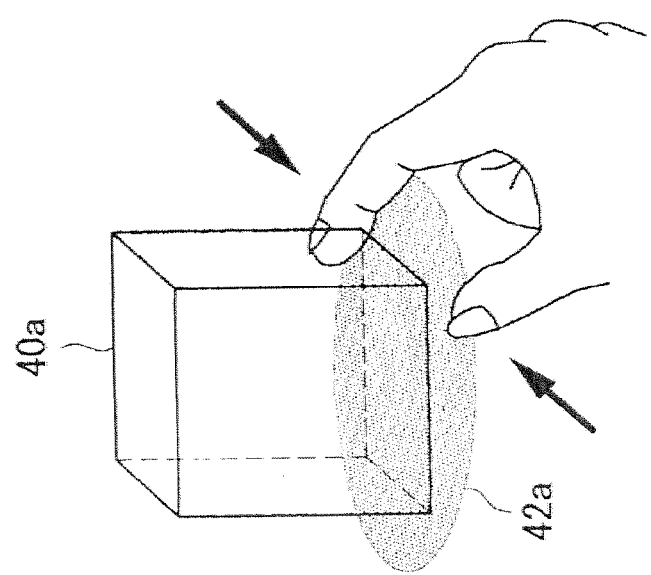

FIG. 14 is a diagram illustrating a pinch-in operation in the third operation example according to the present embodiment. As shown in FIG. 14, when a pinch-in operation is performed on the shadow 42, of the stereoscopic image 40*a*, the shadow is displayed to be smaller in accordance with a distance between the fingers of the user, as shown by a shadow 42*c*. Further, as the shadow is displayed to be smaller, the stereoscopic image is also displayed to be smaller in an isotropic manner, as shown by a stereoscopic image 40*c*.

Fourth Operation Example

The fourth operation example is an example when the user performs a rotation operation on a two-dimensional image. When the rotation operation is determined as a user operation by the determination portion 20, the image generation portion 12 causes the two-dimensional image on which the rotation operation has been performed and the stereoscopic image associated with the two-dimensional image to rotate. Hereinafter, a change in a composite image according to the fourth operation example will be explained with reference to FIG. 15.

Figure 15:
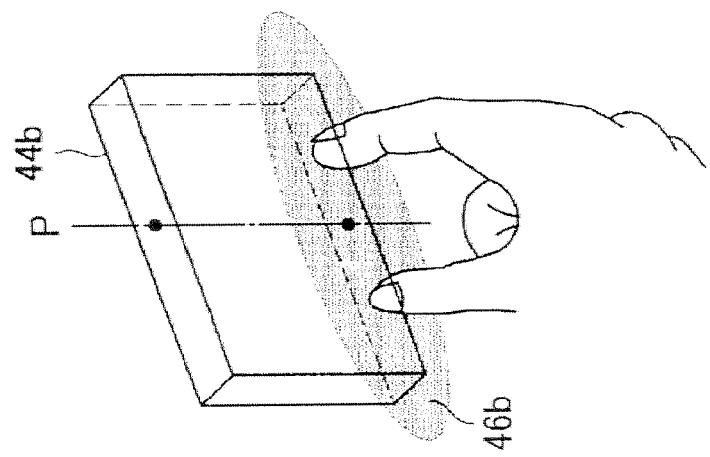
FIG. 15 is a diagram illustrating a fourth operation example according to the embodiment of the present disclosure.
Figure 15:
Figure 15:
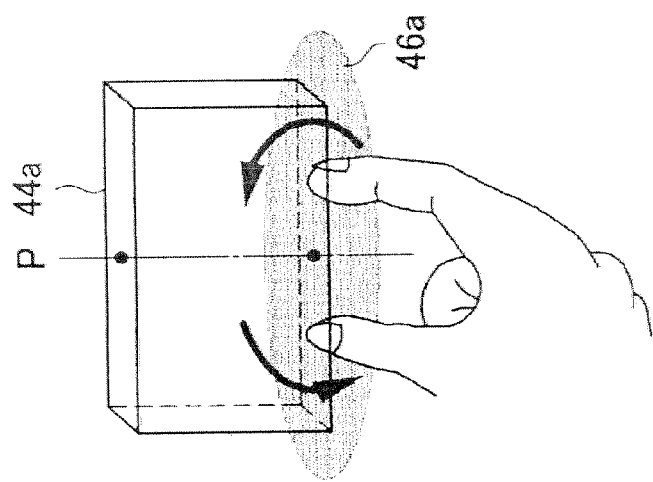

FIG. 15 is a diagram illustrating the fourth operation example according to the present embodiment. As shown in FIG. 15, when the user performs a rotation operation on a shadow 46*a* of a stereoscopic image 44*a*, the images rotate around an axis P, as shown by a stereoscopic image 44*b* and a shadow 46*b*. The axis P is perpendicular to the display screen on which the composite image is displayed. Note that the axis P is not limited to a central axis of the stereoscopic image 44a and the shadow 46a shown in FIG. 15. For example, the axis P may be an axis that is at the right end of the shadow 46a and the stereoscopic image 44a and that is perpendicular to the display screen.

Fifth Operation Example

The fifth operation example is another example when the user performs a pinch-out operation or a pinch-in operation on a two-dimensional image. When the pinch-out operation or the pinch-in operation is determined as a user operation by the determination portion 20, the image generation portion 12 resolves the pinch-out operation or the pinch-in operation into x and y components and causes the composite image to change corresponding to each of the components. Hereinafter, a change in the composite image according to the fifth operation example will be explained with reference to FIG. 16.

Figure 16:
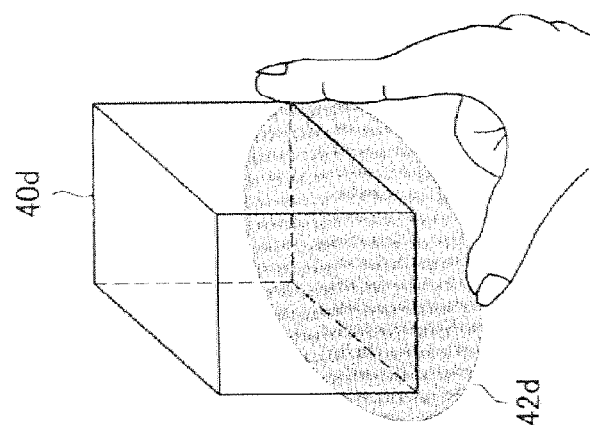
FIG. 16 is a diagram illustrating a pinch-out operation in a fifth operation example according to the embodiment of the present disclosure.
Figure 16:
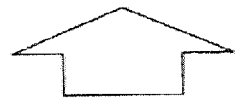
Figure 16:
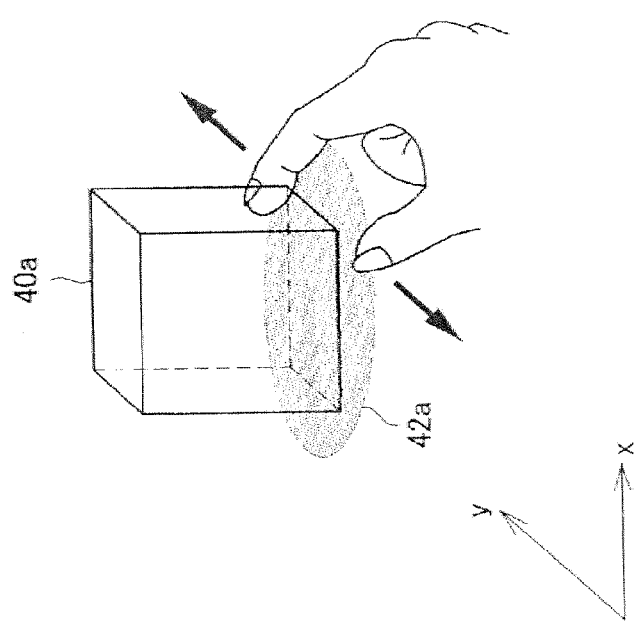

FIG. 16 is a diagram illustrating a pinch-out operation in the fifth operation example according to the present embodiment. As shown in FIG. 16, when the pinch-out operation is performed on the shadow 42a of the stereoscopic image 40a, the image generation portion 12 resolves the pinch-out operation into x and y components, and enlarges the shadow 42a for each of the x and y components.

Then, based on the shape of the changed shadow 42d and on the position of the virtual light source 7 such as that shown in FIG. 5, the image generation portion 12 calculates the shape of a stereoscopic image 40d, which is estimated from the shape of the changed shadow 42d, and causes the shape of the stereoscopic image 40a to change. Note that, if the user performs a pinch-in operation on the shadow 42a of the stereoscopic image 40a, the image generation portion 12 resolves the pinch-in operation into x and y components, and reduces the shadow 42a for each of the x and y components.

Sixth Operation Example

The sixth operation example is an example when the user performs a pinch-out operation or a pinch-in operation on a two-dimensional image that is a shadow of a floating stereoscopic image. When the pinch-out operation or the pinch-in operation is determined as a user operation by the determination portion 20, the image generation portion 12 causes the two-dimensional image on which the pinch-out or pinch-in operation is performed and the stereoscopic image associated with the two-dimensional image to change. Further, the two-dimensional image is associated as a shadow of the stereoscopic image. Note that, as an object floats higher, the shadow diffuses and thus a range in which the color of the shadow is deep becomes smaller. Therefore, the image generation portion 12 displays the shadow such that, as the stereoscopic image floats higher, the range in which the color of the shadow is deep becomes smaller. Hereinafter, a change in the composite image according to the sixth operation example will be explained with reference to FIG. 17 and FIG. 18.

Figure 17:
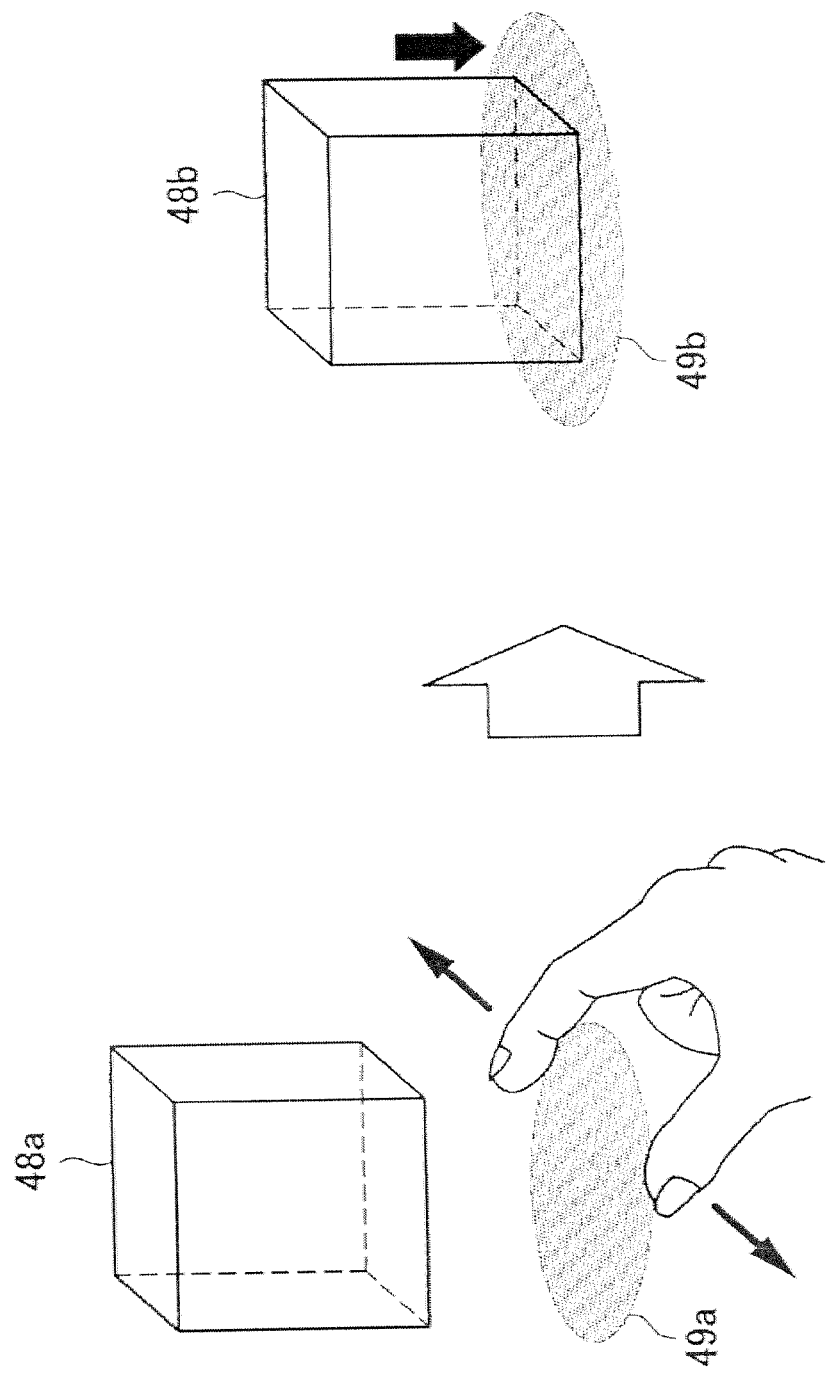
FIG. 17 is a diagram illustrating a pinch-out operation in a sixth operation example according to the embodiment of the present disclosure.

FIG. 17 is a diagram illustrating a pinch-out operation in the sixth operation example according to the present embodiment. As shown in FIG. 17, when a pinch-out operation is performed on a shadow 49a of a floating stereoscopic image 48a, the shadow 49a is displayed to be larger in accordance with a distance between the fingers of the user, and as a result, it is displayed as shown by a shadow 49b. Then, a display position (altitude) of the stereoscopic image 48a becomes lower, and the stereoscopic image is displayed at a low position, as shown by a stereoscopic image 48b, for example.

Figure 18:
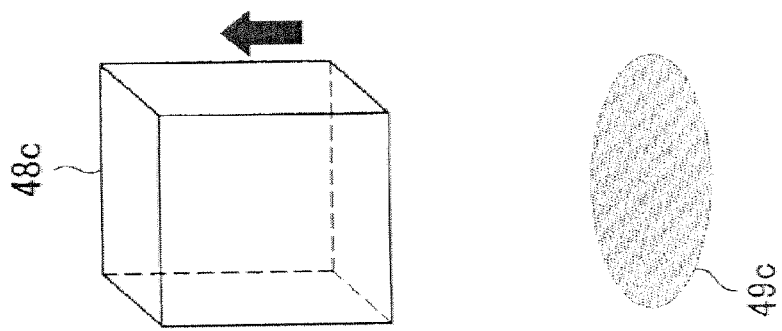
FIG. 18 is a diagram illustrating a pinch-in operation in the sixth operation example according to the embodiment of the present disclosure.
Figure 18:
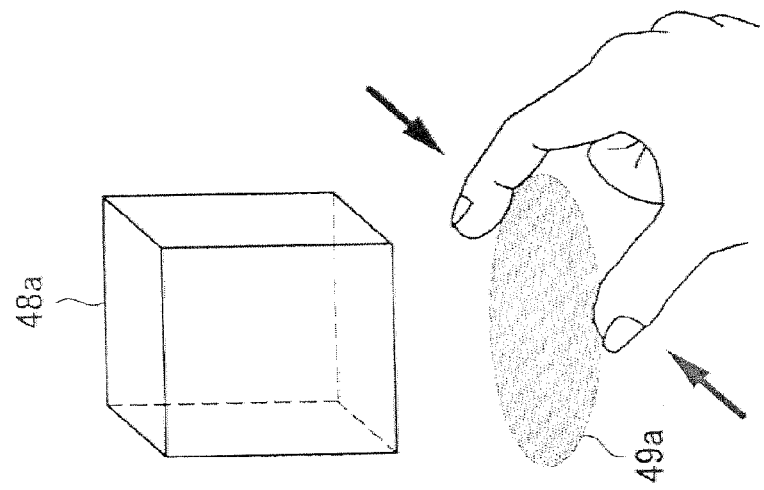

FIG. 18 is a diagram illustrating a pinch-in operation in the sixth operation example according to the present embodiment. As shown in FIG. 18, when a pinch-out operation is performed on the shadow 49a of the floating stereoscopic image 48a, the shadow 49a is displayed to be smaller in accordance with a distance between the fingers of the user, and as a result, it is displayed as shown by a shadow 49c. Then, the display position (altitude) of the stereoscopic image 48a becomes higher, and the stereoscopic image is displayed at a high position, as shown by a stereoscopic image 48c, for example.

3. CONCLUSION

As described above, the information processing device according to an embodiment of the present disclosure can indirectly operate a stereoscopic image by operation of a two-dimensional image that is displayed in association with the stereoscopic image. Thus, it is possible to easily select or operate the stereoscopic image without taking account of an operation position in a three-dimensional space that corresponds to a complicated pop-up shape of the stereoscopic image.

Further, according to the information processing device according to an embodiment of the present disclosure, the stereoscopic image is generated as a phantogram and the two-dimensional image is expressed as a shadow of the stereoscopic image that falls on a flat surface of the display portion 14. As a result, while perceiving the popped up stereoscopic image with a greater sense of reality, the user can operate the shadow of the stereoscopic image that falls on the flat surface without a sense of discomfort.

Hereinabove, the exemplary embodiment of the present disclosure is explained in detail with reference to the accompanying drawings. However, the present technology is not limited to the above-described examples. It should be understood by those skilled in the art that various modifications, combinations, sub-combinations and alterations may occur depending on design requirements and other factors insofar as they are within the scope of the appended claims or the equivalents thereof.

For example, the respective steps in the processing of the information processing device 10 described in this specification do not necessarily have to be performed in time series in the order described in the flowcharts shown in FIG. 8 and FIG. 9. For example, the respective steps in the processing of the information processing device 10 may be performed in an order that is different from the order described in the flowcharts or may be performed in parallel. Specifically, for example, step S104 and step S106 shown in FIG. 8 may be processed in a different order or may be processed in parallel.

Further, each of the structural elements of the information processing device 10 according to the above-described embodiment may be achieved by a hardware configuration, such as a central processing unit (CPU), a read only memory (ROM) and a random access memory (RAM).

Further, a computer program can also be created to achieve a function equivalent to each of the structural elements of the information processing device 10 according to the above-described embodiment. Further, a storage medium on which the computer program is stored is also provided. The storage medium is, for example, a magnetic disk, an optical disk, a magneto optical disk, a flash memory or the like. Further, the above-described computer program may be distributed, for example, via a network without using the recording medium.

Note that the present technology may also take the following configurations.

(1) An information processing device including:

an image generation portion that generates a composite image by synthesizing a stereoscopic image with a two-dimensional image that is associated with the stereoscopic image, the stereoscopic image being generated from a right eye image and a left eye image which have parallax therebetween and on which perspective correction is performed; and an identification portion that, when a user operation on the two-dimensional image is detected, identifies the stereoscopic image with which the two-dimensional image is associated, as a selected target.

(2) The information processing device according to (1) above, in which the image generation portion causes at least one of the stereoscopic image identified by the identification portion and the two-dimensional image to change in accordance with the user operation.

(3) The information processing device according to (1) or (2) above, in which the two-dimensional image is associated with the stereoscopic image by being displayed as a shadow of the stereoscopic image.

(4) The information processing device according to any one of (1) to (3) above, in which the two-dimensional image is associated with the stereoscopic image by including display that indicates the stereoscopic image.

(5) The information processing device according to any one of (1) to (4) above, in which the image generation portion causes a color of at least one of the stereoscopic image identified by the identification portion and the two-dimensional image to change.

(6) The information processing device according to any one of (1) to (5) above, in which the image generation portion causes display positions of the two-dimensional image and the identified stereoscopic image to change in accordance with the user operation on the two-dimensional image.

(7) The information processing device according to any one of (1) to (6) above, in which the image generation portion causes a size of the two-dimensional image to change in accordance with a user operation, and further causes a size of the identified stereoscopic image to change in accordance with the change in the size of the two-dimensional image.

(8) The information processing device according to any one of (1) to (6) above, in which, when the identified stereoscopic image is displayed in a floating manner, the image generation portion causes a size of the two-dimensional image to change in accordance with a user operation, and further causes a display position of the identified stereoscopic image to change in accordance with the change in the size of the two-dimensional image.

(9) The information processing device according to any one of (1) to (8) above, in which, in accordance with a user operation that causes the two-dimensional image to rotate around an axis that is perpendicular to a display screen on which the composite image is displayed, the image generation portion causes the identified stereoscopic image to rotate around the axis.

(10) An information processing method including:

generating a composite image by synthesizing a stereoscopic image with a two-dimensional image that is associated with the stereoscopic image, the stereoscopic image being generated from a right eye image and a left eye image which have parallax therebetween and on which perspective correction is performed; and identifying, when a user operation on the two-dimensional image is detected, the stereoscopic image with which the two-dimensional image is associated, as a selected target.

(11) A program that includes instructions that command a computer to perform:

processing that generates a composite image by synthesizing a stereoscopic image with a two-dimensional image that is associated with the stereoscopic image, the stereoscopic image being generated from a right eye image and a left eye image which have parallax therebetween and on which perspective correction is performed; and processing that, when a user operation on the two-dimensional image is detected, identifies the stereoscopic image with which the two-dimensional image is associated, as a selected target.

(12) The program according to (11) above, in which the processing that generates the composite image causes at least one of the stereoscopic image identified by the identification processing and the two-dimensional image to change in accordance with the user operation.

(13) The program according to (11) or (12) above, in which the two-dimensional image is associated with the stereoscopic image by being displayed as a shadow of the stereoscopic image.

(14) The program according to any one of (1) to (13) above, in which the two-dimensional image is associated with the stereoscopic image by including display that indicates the stereoscopic image.

(15) The program according to any one of (1) to (14) above, in which the processing that generates the composite image causes a color of at least one of the stereoscopic image identified by the identification processing and the two-dimensional image to change.

(16) The program according to any one of (11) to (15) above, in which the processing that generates the composite image causes display positions of the two-dimensional image and the identified stereoscopic image to change in accordance with the user operation on the two-dimensional image.

(17) The program according to any one of (11) to (16) above, in which the processing that generates the composite image causes a size of the two-dimensional image to change in accordance with a user operation, and further causes a size of the identified stereoscopic image to change in accordance with the change in the size of the two-dimensional image.

(18) The program according to any one of (11) to (16) above, in which, when the identified stereoscopic image is displayed in a floating manner, the processing that generates the composite image causes a size of the two-dimensional image to change in accordance with a user operation, and further causes a display position of the identified stereoscopic image to change in accordance with the change in the size of the two-dimensional image.

(19) The program according to any one of (11) to (18) above, in which, in accordance with a user operation that causes the two-dimensional image to rotate around an axis that is perpendicular to a display screen on which the composite image is displayed, the processing that generates the composite image causes the identified stereoscopic image to rotate around the axis.

The present application is a continuation of U.S. patent application Ser. No. 13/487,649 filed on Jun. 4, 2012 which claims priority of the Japanese Patent Application No.

JP2011-129014 filed on Jun. 9, 2011 in the Japan Patent Office, the entire contents of which are incorporated herein by reference.

The invention claimed is:

1. An information processing apparatus, comprising:
one or more processors configured to:
generate first information to display an image of a first virtual object and an image of a second virtual object associated with the first virtual object,
wherein the image of the first virtual object is derived from a right eye image and a left eye image, which have parallax there between and on which perspective correction is executed, and
receive second information based on a detection of a user operation executed on the image of the second virtual object,
wherein the one or more processors, based on the detection of the user operation to the image of the second virtual object itself, are further configured to control change in the display of at least one of the image of the first virtual object or the image of the second virtual object,
wherein, based on the detected user operation determined as a pinch out operation, the one or more processors are further configured to:
resolve the user operation into displacement on a first axis and a second axis, and enlarge the image of the second virtual object based on the resolved displacement on the first axis and the second axis.

2. The information processing apparatus according to claim 1, wherein the one or more processors are further configured to detect the user operation executed on the image of the second virtual object based on a contact or proximity of a user to the information processing apparatus.

3. The information processing apparatus according to claim 2, wherein the user operation executed on the image of the second virtual object includes at least one of tap, drag, pinch in, pinch out or rotation.

4. The information processing apparatus according to claim 1, wherein the one or more processors are further configured to control change in the display of at least one of the image of the first virtual object or the image of the second virtual object based on an amount associated with the user operation.

5. The information processing apparatus according to claim 1, wherein the one or more processors are further configured to generate the image of the first virtual object and the image of the second virtual object, and wherein the image of the first virtual object and the image of the second virtual object are displayed on a display screen.

6. The information processing apparatus according to claim 5, wherein for the pinch out operation, the one or more processors are further configured to:
generate the first information to display the image of the first virtual object based on the enlarged image of the second virtual object and a position of a virtual light source,
wherein the first axis and the second axis are in a plane of the display screen.

7. The information processing apparatus according to claim 5, wherein, for the pinch in operation, the one or more processors are further configured to:
resolve the user operation into displacement on the first axis and the second axis,
reduce the image of the second virtual object based on the resolved displacement on the first axis and the second axis; and
generate the first information to display the image of the first virtual object based on the reduced image of the second virtual object,
wherein the first axis and the second axis are in a plane of the display screen.

8. The information processing apparatus according to claim 5, wherein the image of the second virtual object rotates around an axis that is perpendicular to the display screen based on the detected user operation, and the one or more processors are further configured to cause the image of the first virtual object to rotate around the axis.

9. The information processing apparatus according to claim 5, wherein, based on the image of the first virtual object displayed in a floating manner at a first height in a perpendicular direction from the display screen, the one or more processors are further configured to cause a size of the image of the second virtual object to change, and further cause a display position of the image of the first virtual object to change based on the change in the size of the image of the second virtual object.

10. The information processing apparatus according to claim 9,
wherein the image of the second virtual object is enlarged based on a distance between fingers of the user for the pinch out operation detected as the user operation, and
wherein the image of the first virtual object is displayed in the floating manner at second height in the perpendicular direction from the display screen, wherein the second height of the displayed image of the first virtual object is less than the first height.

11. The information processing apparatus according to claim 1, wherein the image of the second virtual object is associated with the image of the first virtual object by display of the image of the second virtual object as a shadow of the image of the first virtual object.

12. The information processing apparatus according to claim 1, wherein the image of the second virtual object is associated with the image of the first virtual object by including display that indicates the image of the first virtual object.

13. The information processing apparatus according to claim 1, wherein the one or more processors are further configured to cause a color of at least one of the image of the first virtual object or the image of the second virtual object to change.

14. The information processing apparatus according to claim 1, wherein the one or more processors are further configured to cause display positions of the image of the second virtual object and the image of the first virtual object to change based on the detected user operation on the image of the second virtual object.

15. The information processing apparatus according to claim 1, wherein the one or more processors are further configured to cause a size of the image of the second virtual object to change based on the detected user operation, and further cause a size of the image of the first virtual object to change based on the change in the size of the image of the second virtual object.

16. The information processing apparatus according to claim 1, wherein the one or more processors are further configured to generate an image of a third virtual object, wherein the image of the third virtual object visually connects the image of the first virtual object and the image of the second virtual object.

17. An information processing method, comprising:
generating first information to display an image of a first virtual object and an image of a second virtual object associated with the first virtual object,
wherein the image of the first virtual object is derived from a right eye image and a left eye image which have parallax there between and on which perspective correction is executed;
detecting a user operation executed on the image of the second virtual object; and
controlling change in the display of at least one of the image of the second virtual object or the image of the first virtual object based on the detection of the user operation on the image of the second virtual object,
wherein, based on the detected user operation determined as a pinch out operation:
resolving the user operation into displacement on a first axis and a second axis, and enlarging the image of the second virtual object based on the resolved displacement on the first axis and the second axis.

18. A non-transitory computer-readable medium having stored thereon computer-readable instructions, which when executed by a computer, cause the computer to execute operations, the operations comprising:
generating first information to display an image of a first virtual object and an image of a second virtual object associated with the first virtual object,
wherein the image of the first virtual object is derived from a right eye image and a left eye image which have parallax there between and on which perspective correction is executed;
detecting a user operation executed on the image of the second virtual object; and
controlling change in the display of at least one of the image of the second virtual object or the image of the first virtual object based on the detection of the user operation on the image of the second virtual object,
wherein, based on the detected user operation determined as a pinch out operation:
resolving the user operation into displacement on a first axis and a second axis, and enlarging the image of the second virtual object based on the resolved displacement on the first axis and the second axis.

19. The non-transitory computer-readable medium according to claim 18, wherein the user operation executed on the image of the second virtual object includes at least one of tap, drag, pinch in, pinch out or rotation.

20. The non-transitory computer-readable medium according to claim 18, wherein the image of the second virtual object is associated with the image of the first virtual object by being displayed as a shadow of the image of the first virtual object.

21. The non-transitory computer-readable medium according to claim 18, further comprising the step of generating an image of a third virtual object, wherein the image of the third virtual object visually connects the image of the first virtual object and the image of the second virtual object.

* * * * *